United States Patent [19]

Gottselig et al.

[11] Patent Number: 4,961,529

[45] Date of Patent: Oct. 9, 1990

[54] METHOD AND COMPONENTS FOR BONDING A SILICON CARBIDE MOLDED PART TO ANOTHER SUCH PART OR TO A METALLIC PART

[75] Inventors: Bernd Gottselig, Frechen; Ernö Gyarmati; Aristides Naoumidis, both of Jülich, all of Fed. Rep. of Germany

[73] Assignee: Kernforschungsanlage Jülich GmbH, Jülich, Fed. Rep. of Germany

[21] Appl. No.: 287,342

[22] Filed: Dec. 20, 1988

[30] Foreign Application Priority Data

Dec. 24, 1987 [DE] Fed. Rep. of Germany ....... 3744245
Dec. 24, 1987 [DE] Fed. Rep. of Germany ....... 3744250
Apr. 11, 1988 [DE] Fed. Rep. of Germany ....... 3811945

[51] Int. Cl.$^5$ .............................................. B23K 1/012
[52] U.S. Cl. .................... 228/124; 228/122; 228/194; 228/198; 228/263.12; 228/56.3; 428/335; 428/337
[58] Field of Search ............... 156/89; 228/121, 122, 228/124, 263.12, 194, 56.3, 198; 428/335, 337

[56] References Cited

U.S. PATENT DOCUMENTS

| | | | |
|---|---|---|---|
| 3,500,532 | 3/1970 | Lozano et al. | 228/205 |
| 4,483,478 | 11/1984 | Schulz | 228/205 |
| 4,624,403 | 11/1986 | Kohno et al. | 228/263.12 |
| 4,762,269 | 8/1988 | Gyarmati et al. | 228/194 |

FOREIGN PATENT DOCUMENTS

| | | |
|---|---|---|
| 0209672A2 | 1/1987 | European Pat. Off. . |
| 2417478 | 10/1975 | Fed. Rep. of Germany . |
| 2705568 | 8/1978 | Fed. Rep. of Germany . |
| 3003186 | 1/1983 | Fed. Rep. of Germany . |
| 3518710 | 11/1986 | Fed. Rep. of Germany . |
| 57972 | 4/1984 | Japan ................. 228/194 |
| 81071 | 5/1985 | Japan ................. 228/121 |
| 60-251177 | 12/1985 | Japan . |
| WO86/01446 | 3/1986 | Japan . |
| 61-132570 | 6/1986 | Japan . |

OTHER PUBLICATIONS

European Search Report-No. EP 88 12 1379.
Glas-Email-Keramo-Technik, Jun. 1983, Issue 6, pp. 205-210.
Ceramic to Metal Seals by Metallizing and/or Active Brazing, Brazen & Soldering, Autumn 1983, No. 5, pp. 22-25.
Feasibility Study of the Welding of SiC, Jun. 1985, No. 6.
Forschungsberichte der Deutschen Keramischen Gesellschaft, pp. 188-198.
"Fortschrittsberichte der Deutschen Keramischen Gesellschaft", vol. 1 (1985), Issue 2, pp. 188-198.

*Primary Examiner*—Kenneth J. Ramsey
*Attorney, Agent, or Firm*—Frishauf, Holtz, Goodman & Woodward

[57] ABSTRACT

A layer of titanium carbosilicide $Ti_3SiC_2$ on a silicon carbide surface polished for making a joint makes it possible to join silicon carbide bodies together in a hot pressing procedure and obtaining a joint strength comparable to the strength of the silicon carbide material. Such a layer on silicon carbide also makes possible brazed juoints with steel alloy or nickel based alloy parts. The layer may be applied directly by a powder dispersion in a volatile but viscous glycol or by sputtering or else the layer can be made in place from a powder mixture of components, especially $TiC_{0.8}$ and $TiSi_2$ (5:1) or a titanium layer of a thickness in the range of 1 to 3 $\mu$m that reacts with the silicon carbide surface. When silicon carbide parts are joined together, the heating up to make the joint also serves to convert a titanium layer into titanium carbosilicide. When silicon carbide is to be joined with metal, a preliminary heating step is necessary to at first convert a powder mixture or a titanium layer on the silicon carbide surface to $Ti_3SiC_2$. Alternatively a $Ti_3SiC_2$ surface layer can be formed by a sputtering process. The $Ti_3SiC_2$ layer favors brazing of the metal part to the silicon carbide surface as treated. The heating requires reaching a temperature in the region from 1200° to 1600° C. for periods between a half hour to about three hours in the presence of a reducing protective gas.

25 Claims, No Drawings

METHOD AND COMPONENTS FOR BONDING A SILICON CARBIDE MOLDED PART TO ANOTHER SUCH PART OR TO A METALLIC PART

The invention concerns a method of welding together silicon carbide parts or brazing silicon carbide and metal parts together by means of a special bonding layer on a silicon carbide joint surface. It includes the provision of a silicon carbide component having a joint surface prepared for brazing to a metal part.

Silicon carbide is of great interest as a material for high temperature applications. Because of its high strength, however, there are difficulties in shaping this material, as a result of which bodies of complicated shape are produced by bonding together two or more parts.

For bonding silicon carbide molded parts, particularly to each other, various joining procedures are already known among them hot-pressing in which in some cases adhesion-promoting layers are provided along the joint seam.

Thus in German Patent No. 30 03 186 a process is described in which the surfaces containing the silicon are bonded to each other by diffusion welding at up to 1400° C. and at pressures of, for example, 400 bars.

As described in German published patent application (OS) 35 18 710, and in U.S. Pat. No. 4,762,269 molded parts of sintered SiC or hot-pressed SiC are joined together in the hot-press by virtue of the fact that on at least one of the polished joint surfaces a layer having an activating effect is provided which consists of a carbide or silicide forming element from the group Ag, Al, Au, B, Be, Co, Cr, Cu, Fe, Mg, Mn, Mo, Nb, Ni, Pd, Pt, Ti, V, W and Zr, in a layer not exceeding 1 $\mu$m in thickness. The layer can no longer be recognized after the joining procedure.

In German published patent application (OS) 36 08 559 a process is described for bonding silicon carbide molded parts in a hot press in which an adhesion promoting layer of a manganese alloy containing copper or cobalt is provided, with the alloy also possibly containing Cr, Ti, Zr, Fe, Ni and/or Ta. Finally in the periodical "Fortschrittsberichten der Deutschen Keramischen Gesellschaft", Volume 1 (1985) Issue 2, pages 188-198, investigations for diffusion welding of silicon carbide molded parts were reported in which the following elements, considered as elements forming carbides and silicides, were studied as possible adhesion promoters in the joint seam: Pt, Pd, Cu, Ni, Co, Fe, Mn, Cr, Mo, Zr, Nb, Hf, Al, Ti, V, Ta and W. The temperature behavior and strength of the resulting bodies, however, especially along the joint seam, left much to be desired.

SUMMARY OF THE INVENTION

It is an object of the present invention to provide a process for joining silicon carbide molded parts one to another or with metal parts, in which the resulting bodies of these materials have good strength properties and, if possible, strength values along the joint seam that in essence correspond to those of the base material.

Briefly, this objective is fulfilled by using a $Ti_3SiC_2$ layer as a bonding layer. For joining of SiC with SiC by hot-pressing, either an already prepared $Ti_3SiC_2$ phase (e.g. as a powder dispersion) is interposed between the surfaces to be joined or else such a phase is produced in place by the hot-pressing processing procedure by the presence of a thin titanium layer previously applied to at least one the polished surfaces to be joined. Alternatively a powder mixture of $Ti_3SiC_2$ forming components, especially a mixture of $TiC_{0.8}$ and $TiSi_2$ (5 i) can be applied and converted to $Ti_3SiC_2$ during hot pressing.

The titanium carbosilicide $Ti_3SiC_2$ which is put or formed in the joint seam serves to diminish internal strains of the bond after joining, because of its adequate plasticity for that purpose. As a result, the bending strength of the joined product, especially for the product which is joined by a $Ti_3SiC_2$ layer produced in place at the joint seam, is within the standard deviation of the strength values of the base material, whereas heretofore only 30 to 50% of the base material strength was obtained.

The hot-pressing is carried out at a temperature from 1200° to 1600° C., preferably from 1300° to 1500° C. while pressure of from 5 to 100 MPa is applied for at least 0.5 h, and preferably somewhat longer as noted below. The operation is carried out in the presence of reducing protective gas.

The preferred joint temperatures lie between 1450° and 1500° C. and the preferred pressing forces are between 15 and 30 MPa. Hydrogen-containing argon mixtures, among which argon containing 4% hydrogen is preferred, are particularly well-suited for the reducing protective gas that serves to prevent oxidation of the titanium. Other protective gases could also be used to the extent that they make possible the lowering of the oxygen partial pressure above the titanium to a low value.

It is preferred that the time for which the joint parts are held at the level of the joint temperature are preferably from ½ hour to 1 hour. In the case of producing the titanium carbosilicide layer in place, these time periods depend upon the thickness of the titanium layer. For thicknesses of the titanium layer in the range from 1 to 3 $\mu$m, a half hour at the above-mentioned temperature range is already sufficient. Holding the joint in that temperature range for one hour, however, provides the best results for the joint. Longer times of heating the joint are not necessary, but they can be used without disadvantage.

The necessary titanium thickness lies between 1 and 3 $\mu$m for optimum results, especially when it is contemplated to use the resulting article later under corrosive conditions. A joint can also be obtained with a titanium layer thickness less than 1 $\mu$m, but in those cases, the internal strains of the joint that arise during cooling are not so well diminished. Thicker layers of titanium likewise make possible a joint of high strength, but the vulnerability of the joint in cases of exposure to corrosive conditions is then increased.

When the formation of the bonding layer in place is to be used, the matching surfaces of each SiC body to be joined should be polished beforehand, preferably down to a roughness of 0.05 to 0.1 $\mu$m. In the case of greater roughness, care should be taken to provide the applied titanium layer in a greater thickness, at least 1 $\mu$m thicker than the surface roughness of the silicon carbide.

After the preparation for the joining process, impurities are in general present in the surfaces of silicon carbide to be joined, resulting from additives for promoting sintering or residues from previous cleaning or grinding processes, or also intended infiltrations into the ceramic material. Such impurities exert no negative influence on the strength of the bond.

In the joining of SiC molded parts with a previously prepared $Ti_3SiC_2$ phase which is applied in the form of powder (with a grain size smaller than or equal to 5 µm), applied as a dispersion or in a foil, or applied by sputtering, surface roughnesses and $Ti_3SiC_2$ layer thicknesses play only a minor role.

The $Ti_3SiC_2$ phase can to a certain extent be contaminated with foreign phases, such as $TiSi_2$, $Ti_5Si_3$ or TiC, which do not give any trouble so long as the impurity content does not go above 15%.

The $Ti_3SiC_2$ phase can be obtained in the usual way by heating powdered components. For example, it can be formed by intensive homogenizing of very fine Si powder (grain size about 1 µm), colloidal graphite and Ti hydride powder in stoichiometric ratio in an oxygen-free environment and heating the mixture to a temperature between 1250° and 1550° C. for one hour. This produces a product that consists predominantly of $Ti_3SiC_2$. Alternatively, mixtures of titanium hydride and silicon carbide, titanium carbide and silicon can be used as starting materials, and likewise titanium carbide and titanium silicide. A particularly useful mixture of starting materials is a mixture of $TiC_{0.8}$ with $TiSi_2$ in approximately a 5:1 ratio. This powder mixture can be converted to the desired product by heating to 1400° C. for one to two hours. It is particularly favorable to use powder mixtures with a slight excess of $TiSi_2$, especially $TiC_{0.8} + TiSi_2$ mixtures in the ratio of 5:1.06.

Such powders can be conveniently used in the form of a dispersion especially on uneven surfaces or surfaces that deviate from the horizontal. The powder is first stirred to produce a dispersion in a viscous alcohol such as ethylene glycol, diethylene glycol, or the like. This dispersion is then applied to the surface to b in a conventional way, such by rolling on, painting on, printing on, etc. After the surfaces to be joined are put together, a vaporizing of the dispersion medium by warming takes place, occasionally assisted by reducing below atmospheric pressure immediately before the bonding of the bodies to be joined in the hot press.

A particularly useful process makes use of an insert piece of silicon carbide having on opposite sides surfaces matching the surfaces of the body to which it is decided to join, for example, the use of a silicon carbide ring for bonding silicon carbide tube ends. The opposite sides of the ring are provided either with a titanium film of a thickness from 1 to 3 µm or with a $Ti_3SiC_2$ layer (especially by sputtering or convertion of a powder mixture of components as $TiC_{0.8} + TiSi_2$ (5:1)). In this manner, the trouble of providing a titanium layer on larger parts which may be more difficult to manipulate can be avoided.

A $Ti_3SiC_2$ layer on silicon carbide is suitable not only as an intermediate layer for joining together silicon carbide molded parts, but is also suitable for bonding silicon carbide molded parts with metal parts, because the layer has the property of providing a surface readily wetted by molten metal. The metal part to be joined can be brazed to the silicon carbide surface provided with a $Ti_3SiC_2$ layer in accordance with the invention.

In making such joints, the surface of silicon carbide to be joined is first polished and then preferably a titanium layer 1 to 3 µ thick is applied to it, after which the silicon carbide body is temperature in the range from 1200 to 1600° C., preferably 1300° to 1500° C., for a period of at least a half hour in the presence of a reducing protective gas. Alternatively $Ti_3SiC_2$ may be applied by sputtering or conversion components.

Such a $Ti_3SiC_2$ layer provided on the silicon carbide surface assures on the one hand good adhesion at the transition from ceramic to metal and substantially prevents on the other hand the formation of interfering reaction products at the interface.

Silicon carbide molded parts having a surface layer of $Ti_3SiC_2$ spread on the surface to be joined can be used, as soon as they are removed from the furnace, for bonding with practically any desired metal parts by brazing, except that active metals such as titanium and zirconium and the like should be avoided. Successful brazer joints with iron-based or nickel-based alloys can be produced by brazing with copper-base brazing materials, silver-base brazing materials, nickel-base brazing materials and palladium-base brazing materials.

Silicon carbide ceramic bodies with a $Ti_3SiC_2$ surface layer already in place for joining can simply be prepared and sold as such for use as components of a composite assembly.

The invention is further described by reference to particular illustrative examples.

Examples 1, 2 and 3 concern joining silicon carbide molded parts together by means of a $Ti_3SiC_2$ layer which is produced in place;

Examples 4 to 6 illustrate the bonding of silicon carbide molded parts to each other with the use of a preliminarily prepared $Ti_3SiC_2$ phase and Example 7 illustrates the bonding of SiC molded parts with metal parts.

EXAMPLES 1, 2 AND 3

In each of the examples that follow, a rectangular plate of silicon carbide is divided into pieces. The individual pieces are then joined together in a press after applying a layer of titanium on the surfaces to be joined. The examples differ in conditions at the joint as shown below in a table.

In each case, the silicon carbide plate is cut into three parts, of which the middle segment has a width of about 3 mm. The cut surfaces are ground and polished and the middle segment is coated on both sides with titanium in a sputtering apparatus. The three pieces and then put back together and then put into a press provided with a guide maintaining the pieces in the desired position during the hot pressing.

After application of a small preliminary pressure on the parts to be joined, the press is closed and the joining chamber is evacuated. After sufficient reduction of pressure (down to $10^{-2}$ torr) protective gas is circulated through the apparatus which is then heated up to the temperature of joining. After the actual joining time has elapsed, the electric supply is turned off and the apparatus is allowed to cool to room temperature by convection, then the gas flow is stopped. After cooling the joined sample is removed from the press and tested. The following table shows the different conditions that were maintained in the respective examples 1, 2 and 3.

|  | (1) | (2) | (3) |
| --- | --- | --- | --- |
| Roughness of the | Rgh = 0.05 µm | Rgh = 0.1 µm | Rgh = 0.05 µm |

-continued

|  | (1) | (2) | (3) |
|---|---|---|---|
| Matching Surfaces |  |  |  |
| Titanium layer thickness | $D_{Ti} = 1.0\ \mu m$ | $D_{Ti} = 3.0\ \mu m$ | $D_{Ti} = 3.0\ \mu m$ |
| Heat-up Rate | $t_{up} = 300°\ C./min$ | $t_{up} = 300°\ C./min$ | $t_{up} = 150°\ C./min$ |
| Joint Temperature | $T_G = 1450°\ C.$ | $T_G = 1450°\ C.$ | $T_G = 1450°\ C.$ |
| Joining Time | $t_G = 1\ h$ | $t_G = 0.5\ h$ | $t_G = 1\ h$ |
| Atmosphere | Ar/4% H$_2$ | Ar/4% H$_2$ | Ar/4% H$_2$ |
| Pressing Force | p = 30 MPa | p = 30 MPa | p = 15 MPa |

In all three cases the strength of the joined article was equal to that of the base material.

EXAMPLE 4

A silicon carbide block, at one surface thereof, intended to be a joint surface, was moistened with diethylene glycol and then dusted with Ti$_3$SiC$_2$ powder. The facing surface of a second silicon carbide block was laid upon the treated surface of the first-mentioned block and the two blocks were then mounted with positioning restraint in a graphite holder. This assembly was then heated from room temperature to 1450° C., slowly, in three hours, in a hot press, in an atmosphere of argon at 300KPa containing an admixture of 4% hydrogen with the blocks being pressed together at 20MPa. Then, after the holding time at 1450° C. of 0.5 hour and thereafter cooling, the sample was cut into test pieces and the strength of the joint was measured in a 4-point bending machine. The bending strength of the joined samples was identical with the strength of the starting material.

EXAMPLE 5

A silicon carbide ring with flat end surfaces perpendicular to its axis was treated by sputtering a 2 μm thick Ti$_3$SiC$_2$ layer on each of the end surfaces The target in the sputtering apparatus which served as the sputter source was made by pressing together Ti$_3$SiC$_2$ powder, in a graphite matrix mold having a silicon carbide surface, the pressing of the powder being done at a temperature between 1300° and 1500° C. and pressures from 15 to 50 MPa for a duration in the range from 0.5 to 5 hours. The ring coated on its two opposite sides was interposed between the respective end surfaces of two pieces of SiC tubing having the same cross-section as the ring. The joint was made in the manner described in Example 4. The strength tests gave the same result as in Example 4.

EXAMPLE 6

In order to join a hollowed-out mold-shaped silicon carbide surface with a matching plug, a foil of Ti$_3$SiC$_2$ having the corresponding contour was made. For the preparation of this foil, a NaCl pressing was made in a first step by means of a surface that was identical to that of the matching plug, by pressing finely crystallized NaCl in a steel pressing mold. In a second process step, a Ti$_3$SiC$_2$ layer with a thickness of about 3μm was sputtered onto the NaCl matching plug. Then the NaCl matching plug coated with the Ti SiC2 was introduced into the matching silicon carbide mold, after which the NaCl was dissolved away with water. After a drying period, the SiC matching plug was put into the mold and the assembly was hot-pressed as described in Example 4. The strength of the joint that was obtained corresponded in this case also to the strength of the starting material.

EXAMPLE 7

The preparation of the silicon carbide ceramic pieces for joining with metal comprises essentially the following steps: polishing the SiC ceramic surface to a roughness Rgh in the range from 0.01 to 0.1 μm; applying a titanium layer of a thickness from 1 to 3 μm on the polished surface, in particular by sputtering titanium onto the surface. Preferably the polished silicon carbide surface is first freed from impurties adhering to the ceramic surface by etching with argon ions Ar+; and heating the titanium coated ceramic surface for converting the surface layer into titanium carbosilicide (Ti$_3$SiC$_2$) to temperatures in the range from 1200° to 1550° C. in the presence of protective gas, more particularly as follows:

The workpiece with a titanium coated surface is put into a furnace which is evacuated to about 1 Pa. Thereafter the furnace is connected to a stream of protective gas (argon of 99.9997% purity) for flushing the interior of the furnace. The gas stream in this operation is first dried by passing over P$_2$O$_5$ and then passed over titanium sponge in order to remove oxidizing residues. Next the workpiece, and more particularly its coated surface, is up for at least a half hour to the above-mentioned heating temperature, more particularly to about 1450° C. The rate in this step may lie, for example, between 20 and 60° C. per minute or higher.

The treatment duration at the high temperature depends upon the thickness of the titanium layer and, more particularly, is in the range from about 1 to 2 hours. Thus, for example, material coated with a 3.0 μm layer of titanium is held for about 2 hours at 1450° C.

The cooling takes place in the furnace, out of which the coated workpiece is removed when cooled.

The ceramic surface treated in the above way has a surface layer of which about 95% is titanium carbosilicide (Ti SiC2) with traces of TiSi$_2$ and TiC. The layer is firmly interlocked with the ceramic and is remarkably well-suited for brazing to metals such as alloy steel or nickel-base alloys in particular, in the manner described below.

(1) Procedure for Brazing

With brazing temperatures up to 1200° C. and usually from 900° to 1100° C., the surface treated as above described can be used to produce strong, soldered bonds with metal parts with the use of the usual solders for brazing compounds for these temperatures. The metal parts can be of the usual metal alloys which must not, however, contain reactive metals such as titanium, zirconium and the like.

The metallic piece to be brazed should in each case be ground and polished before joining so that the final roughness Rgh that is obtained for the contact surface lies in the range from 0,01 to 0,1 μm.

Examples of metals which have been joined to silicon carbide in the above procedure to obtain joint strength comparable with that of the silicon carbide material are INCONEL 617 and Incoloy 800 H.

Although the invention has been described with reference to particular examples, it will be understood that modifications and variations are possible within the invention concept.

We claim:

1. Process for bonding a first molded body of silicon carbide to a second molded body of silicon carbide, said first and second bodies having respective surfaces to be joined which match each other in configuration, said process comprising the steps of:
   interposing a $Ti_3SiC_2$ layer between and in contact with said matching surfaces of said first and second bodies, and
   heating and hot-pressing said bodies and their said matching surfaces together with said $Ti_3SiC_2$ layer interposed between them in the presence of a reducing protective gas at a temperature in the range from 1200° to 1600° C. for at least 30 minutes with pressing of said bodies together with a pressure from 5 to 100 MPa, and thereby firmly joining said first and second bodies at their said matching surfaces.

2. Process according to claim 1, wherein the interposition of said layer between said matching surfaces of said respective bodies is performed by applying said $Ti_3SiC_2$ layer to said matching surfaces of said first body by a method selected from the group consisting of application as a powder layer, application as a powder dispersion in a volatile and viscous dispersion medium, application as a foil, and application by sputtering.

3. Process according to claim 2, wherein said $Ti_3SiC_2$ layer contains not more than 15% of Ti-containing, Si-containing and/or C-containing foreign phases.

4. Process according to claim 3, wherein a substantially pure phase of $Ti_3SiC_2$ which constitutes at least 80% of said $Ti_3SiC_2$ layer is present in said layer as powder having a maximum powder grain diameter of 5 μm.

5. Process according to claim 2, wherein said $Ti_3SiC_2$ is produced by heating an approximately 5:1 by weight powder mixture of $TiC_{0.8}$ and $TiSi_2$.

6. Process for bonding a first molded body of silicon carbide to a second molded body of silicon carbide, said first and second bodies having respective surfaces to be joined which match each other in configuration, said process comprising the steps of:
   preliminarily polishing said matching surfaces of said bodies;
   applying to at leat one of them a titanium layer having a thickness greater than 1μm and not greater than 3μm, and
   heating and hot-pressing said bodies and their said matching surfaces together with said titanium layer interposed between them in the presence of a reducing protective gas at a temperature in the range from 1200° to 1600° C. for at least 30 minutes with pressing of said bodies together with a pressure from 5 to 100 MPa thus causing said titanium layer to be converted into a persistent $Ti_3SiC_2$ layer which firmly joins said first and second bodies at their said matching surfaces.

7. Process according to claim 1, wherein said hot-pressing is performed in the temperature range fromn 1450° to 1500° C.

8. Process according to claim 6, wherein siad hot-pressing is performed in the temperature range from 1450° to 1500° C., 9. Process according to claim 1, wherein said hot-pressing is performed with a pressure between 15 and 30 MPa.

10. Process according to claim 6, wherein said hot-pressing is performed with a pressure between 15 and 30 MPa.

11. Process according to claim 1, wherein said hot-pressing is performed for a period of about one hour.

12. Process according to claim 6, wherein said hot-pressing is performed for a period of about one hour.

13. Process according to claim 1, wherein said protective gas consists essentially of argon with a 4% by volume admixture of hydrogen.

14. Process according to claim 6, wherein said protective gas consists essentially of argon with a 4% by volume admixture of hydrogen.

15. Process according to claim 1, wherein said matching surfaces of said respective bodies are joined by interposition of two said $Ti_3SiC_2$ layers which are separated by an intermediate third body of SiC having opposite sides of configurations respectively matching said matching surfaces of said first and second SiC bodies and having a thickness between said opposite sides which is in the range from 1 to 10 mm, on which opposite sides of said third body $Ti_3SiC_2$ layers are applied before pressing, and wherein hot-pressing is performed after said third SiC body having said layers thereon is interposed between said matching surfaces respectively of said first and second SiC bodies.

16. Process according to claim 15, wherein said $Ti_3SiC_2$ is produced by heating an approximately 5:1 by weight powder mixture of $TiO_{0.8}$ and $TiSi_2$.

17. Process according to claim 6, wherein said matching surfaces of said respective bodies are joined by interposition of two said $Ti_3SiC_2$ layers which are separated by an intermediate third body of SiC having opposite sides of configurations respectively matching said matching surfaces of said first and second SiC bodies and having a thickness between said opposite sides which is in the range from 1 to 10 mm, on which said opposite sides of said third body titanium layers are applied which each have a thickness in the range from 1 to 3 μm before pressing, and wherein hot-pressing is performed after said third SiC body having said layers thereon is interposed between said matching surfaces respectively of said first and second SiC bodies.

18. Process for bonding a first body which is a molded silcon carbide body to a metallic body consisting preponderantly of a metal selected from the group consisting of iron and nickel alloys and having no significant content of reactive alloy components, said first body and said metallic body having respective surfaces to be joined which match each other in configuration, said process comprising the steps of:
   applying a $Ti_3SiC_2$ layer to said matching surface of said first body, said $Ti SiC_2$ layer being formed by one measure of the group consisting of
   (i) applying a titanium layer of 1 to 3 μm thickness onto said surfaces and heating said titanium covered surfaces to a temperature in the range of 1200 to 1600° C.;

(ii) sputtering $Ti_3SiC_2$ from a $Ti_3SiC_2$ target onto said surfaces or (iii) applying a powder mixture of $TiC_{0.8}$ and $TiSi_2$ (5:1) onto said surfaces and heating said covered surfaces to a temperature in the range of 1200° to 1600° C., and joining said metallic body to said first body having said $Ti_3SiC_2$ layer already applied thereto, at said matching surfaces of the respective bodies, by brazing 19. Process according to claim 18, wherein said heating step is performed at a temperature in the range from 1450° to 1500° C.

20. Process according to claim 6, wherein after said at least one matching surface is polished and before application thereto of said titanium layer, said at least one matching surface of said first body is cleaned by argon ion (Ar+) etching.

21. Process according to claim 18, wherein after polishing said matching surface of said first body and before applying thereto said titanium layer, said matching surface of said first body is cleaned by argon ion (Ar+) etching.

22. Process according to claim 6, wherein said titanium layer is applied to said at least one matching surface by sputtering.

23. Process according to claim 18, wherein said titanium layer is applied to said matching surface of said first body by sputtering.

24. A silicon carbide insert piece having two matching polished surfaces for matching respectively with surfaces of two silicon carbide bodies to be joined, said insert piece having a thickness in the range of 1 to 10 mm and having a titanium layer of a thickness greater than 1μm and not greater than 3μm on each of its said matching surfaces.

25. A silicon carbide insert piece having two matching polished surfaces for matching respectively with surfaces of two silicon carbide bodies to be joined, said insert piece having a thickness in the range of 1 to 10 mm and having a $Ti_3SiC_2$ layer on each of its said surfaces.

* * * * *